UNITED STATES PATENT OFFICE.

CARLETON ELLIS, OF MONTCLAIR, NEW JERSEY.

ART OF CATALYSIS.

1,300,144. Specification of Letters Patent. Patented Apr. 8, 1919.

No Drawing. Original application filed March 29, 1912, Serial No. 686,988. Divided and this application filed September 6, 1916. Serial No. 118,750.

*To all whom it may concern:*

Be it known that I, CARLETON ELLIS, a citizen of the United States, residing at Montclair, in the county of Essex and State of New Jersey, have invented certain new and useful Improvements in the Art of Catalysis, of which the following is a specification.

This invention relates to a method of treating fatty materials and the like, especially unsaturated fats and fatty glycerids and other organic material containing unsaturated components, by means of hydrogen, or gases containing hydrogen for the purpose of saturating to a greater or less extent such unsaturated bodies.

It is the object of the present invention to provide a simple, cheap and ready method of forming saturated fatty material, which shall be free from the disadvantages of the older methods and shall have certain new and valuable advantages giving enhanced yields with a simpler, surer and less laborious operation.

In the preferred form of my invention involving such operations in a continuous way, the fatty material, as for example cotton seed oil, or oleic acid, is passed through a tube or tower, preferably of considerable length or height, in the form of a traveling stream which progressively advances against a counter current of hydrogen or hydrogen containing gas, as water gas, for instance.

Hydrogen may be employed in its pure state, or as gas mixtures containing the same, for example water gas, etc.

The material to be treated may be brought into contact with the hydrogen or gas containing the same, in various ways, such as by counter currents in filled towers. Some of the materials treated may be dissolved in appropriate liquids, before being subjected to the hydrogenation.

A variation of the process may be practised when hydrogen instead of water gas is used. This consists in passing the hydrogen through the conduit and allowing the residual or consumed gas to reënter the lower part of the conduit so that the gas travels in a cyclic path; thus a more rapid flow of the gas is created which somewhat favors absorption.

This invention further relates to the treatment of fatty materials by hydrogen in the presence of a body capable as serving as a carrier of the hydrogen to the aforesaid fatty material and relates in part to the treatment of fats and oils with hydrogen in the presence of charcoal or other forms of carbon.

The oils which I aim particularly to treat in accordance with the invention, are the semi-drying oils, such as olein and palmitin mixtures and other esters of fatty acids, or the fatty acids themselves. I may also treat oils containing linoleic, or linolenic acids or esters, to convert these highly unsaturated bodies into more saturated bodies, so that oils which would otherwise have the tendency to become gummy on exposure to air, may be rendered resistant to oxidation. A good many oils contain a small percentage of these highly unsaturated bodies and the addition of but a small amount of hydrogen to the oil suffices to overcome the undesirable quality of gumming on exposure. Even as little as $\frac{1}{10}$ to $\frac{1}{20}$ per cent. oftentimes suffices. Another feature of the invention is the treatment of oils which are liquid at ordinary temperatures so as to produce solid, consistent fats. Cotton seed oil, for example, may be treated with a small percentage of hydrogen to form a solid fat suitable for edible purposes, such for example, as a product which may be used as a substitute for lard in culinary operations. Another feature of the invention is the treatment of oils having a strong odor, with hydrogen under conditions which bring about their deodorization, at the same time also improving their consistency. Fish oil, which has a pronounced odor may be rendered almost odorless and converted into a consistent fat by the addition of but a small amount of hydrogen. Thus, fatty oils, which have heretofore not been very suitable for soap making purposes, are now rendered adaptable to this use. Cotton seed oil may be "sweetened" by hydrogen, as may also various other oils which have no marked nor disagreeable odor. Castor oil may be treated with hydrogen to secure a most useful product better adapted for use in the arts in a variety of applications than is the normal oil. Ordinarily, it is not desirable to treat linseed oil, Chinese wood oil, Perilla oil and other drying oils with hydrogen, as such treatment reduces their siccative properties, but for the purpose of reducing the odor of such oils as wood oil, it is possible to partially treat with hydrogen to good advantage. Some of the petroleum oils, more particularly the highly unsaturated oils, carrying olefins, may also be treated with hydrogen in a similar manner. Resins, and in particular ordinary rosin, may be hardened by hydrogen under certain conditions. Wool grease is improved in odor by the addition of a moderate amount of hydrogen.

In the present invention, I may also treat fatty materials such as mentioned above, or other material of a similar character with hydrogen gas, or similar reducing gas in the presence of a non-metallic body capable of occluding hydrogen, such as carbon in its various forms, and particularly charcoal, although animal black, bone black, lamp black and the like may be used.

Charcoal has the property of absorbing gases to a marked degree. At atmospheric pressure, freshly prepared charcoal will absorb about four volumes of hydrogen at 0° C. This occluding effect increases with the pressure but is reduced to some extent by increase in temperature, and when charcoal is used, I take cognizance of this relation between pressure and temperature in order to secure most effective action at a given temperature. The charcoal acts also as a bleaching and deodorizing agent and is therefore useful as an occluding agent for hydrogen.

Charcoal may be used as a supporting agent for metallic catalyzers, including such elementary catalyzers as nickel, platinum, palladium, copper and the like, and others mentioned in my Patent 1,217,118. The advantages of charcoal, or other forms of carbon as a supporting material are several. In the case of a catalyzer of a metallic nature which becomes spent after using for a time, the charcoal carrying the metal may be ignited when the metal, or its oxidation products are recovered and may be prepared again for use. This obviates the necessity of treatment with acid to dissolve a small amount of the metal catalyzer from a large amount of supporting material of an inert character, such as pumice, infusorial earth, asbestos and the like. Another advantage is because of the occluding action of charcoal for hydrogen, there exists the joint action of the charcoal and the metallic catalyzer upon oil, which improves or accelerates reaction.

In preparing the charcoal for use in this way I preferably ignite a good grade of charcoal to expel any gases which may have been absorbed. It is desirable to remove all air from the pores of the charcoal and therefore, after the charcoal has been ignited and before it is cooled, I preferably pass through the mass a gentle current of hydrogen gas.

I prefer not to impregnate the charcoal too deeply with such a catalyzer agent of a metallic character, but instead preferably treat the material so as to have merely a thin or substantially superficial layer of the metallic catalyzer on the charcoal support.

As stated, the hydrogen employed should be pure to get the best results with some catalyzers, although in some cases the presence of impurities does no material harm. Arsenic should be avoided with catalyzers of the nature of platinum because of its poisoning action. Nickel salts of high purity are used in preference to the commercial grades. A metallic catalyzer is often quickly affected by oxygen, so it is desirable not to expose the finished catalyzer body to air prior to its actual use.

It is also desirable to remove the air from the oil employed and to this end it is to be recommended that the oil be heated to a temperature of about 150 degrees or even higher prior to mingling with the catalyzer. Blowing the oil with hydrogen gas, immediately before using is also beneficial.

The charcoal occluding agent, such as specifically mentioned, should be preferably in a granular form, the size being varied to suit the particular conditions. Granules ranging in size from $\frac{1}{8}''$ to $\frac{1}{2}''$ may be employed. When the pores of the charcoal have been fairly well sealed by the heavy coating of the metallic catalyzer, if same is used, the granules of charcoal will float for a long time on the surface of the oils; which sometimes affords an especially desirable method of treatment, in that the oil may be placed in a tank with the catalytic body floating on the surface and hydrogen forced into the upper portion of said tank, this affording a surface contact which is sometimes desirable for rapid hydrogenation. The oil may be caused to gently circulate in the tank so that fresh portions are brought from the bottom of the tank to the top. The contents of the tank may be heated to 160 degrees C., or 180 degrees C. or thereabout according to circumstances.

The selective hydrogenation of oils to reduce merely the highly unsaturated bodies preferably is conducted at a somewhat lower temperature.

The oil may also be treated in other specific ways in the presence of a catalyzing body, as, for example, by violently agitating the oil in the presence of a catalyzer, or by atomization, or by filtration through a heated bed of charcoal granules with or without a metallic catalyzer. Another method which may be used is that of passing the oil through a large tube, which preferably is differentially heated, which tube is partially or entirely filled with charcoal granules, with or without a metallic catalyzer. This tube is gently inclined and the oil is allowed to flow gently in one direction, while hydrogen gas is passed in a counter direction. This manner of treatment has been described in my U. S. Patent No. 1,026,126.

A convenient method of coating charcoal, or similar carbonaceous occluding agents with a metallic catalyzer is that of electrolytically depositing the metal from a conductive saline solution on charcoal granules. For the purpose a current of relatively high density preferably is employed in order to produce a metallic sponge in a highly comminuted state.

As stated, a temperature of 160 to 170 degrees is well suited for the treatment of many fats and oils and I preferably employ temperature ranging between 150 and 200 degrees C., although temperatures of lower degrees may be employed with the charcoal, or other carbon-containing occluding agents, than when a metallic catalyzer is used alone. This has an advantage, as the oil is less likely to be discolored when the operation is conducted at a moderate temperature. On the other hand, the heating of the oil to temperatures above 200 degrees is undesirable as a rule because of the danger of discoloration. At the temperature mentioned, it is sometimes desirable to employ the hydrogen under considerable pressure, preferably at 10-lbs. to a square inch and more effectively at a pressure of about 25-lbs. to the square inch, although a pressure higher than this may be employed when desired.

Wherever the term "charcoal" has been used in the foregoing, it should be understood to comprise a non-metallic body consisting essentially of carbon and capable of occluding hydrogen; and likewise the use of the term "fatty-material" embraces all oils and fats of use in the arts.

Without limiting myself to any specific form of apparatus, I will state that a filled tower apparatus may be used for carrying out many of the modifications of my process. Such an apparatus is illustrated in my copending application, 686,988, filed March 29, 1912, of which the present case is a division (now Patent 1,217,118) and the present case also contains matter disclosed in my prior application 679,771, particularly as regards the use of a charcoal base for catalytic material, and also as regards coating such charcoal by electrical treatment.

The tower may be filled with fragmental material of an active character, including granular charcoal, selenium or in some instances, fragmental material of an inert nature may be employed.

In the process of hydrogenation, as herein described, some metal catalyzers, as for example, nickel, are sensitive to arsenic, or chlorin. Oxygen also tends to reduce the efficiency of this metal and steam sometimes is detrimental. The purification of hydrogen-containing gas to eliminate this, or other undesirable impurities exerting inhibiting or anti-catalytic action, therefore falls within the purview of my invention.

In an apparatus such as identified above, the raw oil entering the first tower may be cold, and the spent gases passing through the cold oil heated somewhat and the heat of the gases is thus given up to the oil in a measure, thus constituting a heat interchange or regenerative system. The oil is more thoroughly heated, as stated, by the steam coils suitably situated in the towers. On the other hand, the oil may be introduced in a heated condition at a substantially lower temperature than desired for the reaction.

The process may also be applied to the hydrogenation of other organic materials containing unsaturated components, examples of such materials are wool grease, resins, (notably damar, sandarac, mastic, shellac, elemi, thus, copal, pontianak and especially rosin), naphthalene, waxes (e. g. Japan wax, Montan wax, beeswax and others) acid pitches, tars, asphaltic oils, malthas, and other asphaltic bodies, rubber, volatile solvents, e. g. wood tar oils, wood turpentine, rosin spirits, such materials are to be treated in a liquid (molten or dissolved in suitable solvents) at temperatures of about 150 to 200, more or less.

The electrolytic production of the catalyzer used in the process forming the subject matter of the claims of the present application, is claimed in my copending application 131,253, filed November 14, 1916.

What I claim is:

1. In the hydrogenation of fatty oils containing unsaturated components, the step of treating such an oil with hydrogen in the presence of a catalyst comprising an electrically deposited, sponge-like, finely divided catalytic metal, carried upon a charcoal base.

2. In the hydrogenation of fatty oils containing unsaturated components, the step of treating such oil with hydrogen in the presence of a catalyst comprising an electrically deposited sponge-like, finely divided catalytic metal, carried upon a base composed of a non-metallic body containing a high percentage of carbon and capable of occluding hydrogen.

In testimony whereof I affix my signature.

CARLETON ELLIS.